United States Patent [19]
Standard

[11] Patent Number: 5,549,734
[45] Date of Patent: Aug. 27, 1996

[54] BAGHOUSE CLEANING METHOD

[75] Inventor: Thomas A. Standard, Chattanooga, Tenn.

[73] Assignee: Astec Industries, Inc., Chattanooga, Tenn.

[21] Appl. No.: 400,751

[22] Filed: Mar. 8, 1995

[51] Int. Cl.$^6$ .................................................. B01D 46/00
[52] U.S. Cl. ........................... 95/279; 55/287; 55/302; 95/280; 95/282
[58] Field of Search ........................... 55/286, 287, 288, 55/302; 95/279, 280, 282, 278

[56] References Cited

U.S. PATENT DOCUMENTS

| 608,587 | 8/1898 | Draver | 55/287 |
|---|---|---|---|
| 699,460 | 5/1902 | Draver | 55/287 |
| 1,784,339 | 12/1930 | Clasen et al. | 55/288 |
| 2,534,600 | 12/1950 | Hutchings | 55/287 |
| 2,765,047 | 10/1956 | Hersey, Jr. | 55/287 |
| 2,829,735 | 4/1958 | Kroll . | |
| 2,974,748 | 3/1961 | Swanson | 55/287 |
| 3,594,992 | 7/1971 | Carr et al. | 55/302 |
| 3,726,066 | 4/1973 | Colley et al. . | |
| 3,739,557 | 6/1973 | Anderson et al. | 55/302 |
| 3,838,555 | 10/1974 | Kubiak | 55/286 |
| 3,877,899 | 4/1975 | Bundy et al. | 55/302 |
| 3,951,627 | 4/1976 | Barr, Jr. et al. | 55/284 |
| 4,046,526 | 9/1977 | Phillippi | 95/279 |
| 4,211,490 | 7/1980 | Brock et al. | 366/11 |
| 4,292,053 | 9/1981 | Remillieux | 95/279 |
| 5,178,652 | 1/1993 | Huttlin | 95/279 |
| 5,462,678 | 10/1995 | Rosaen | 55/302 |

FOREIGN PATENT DOCUMENTS

| 3341786 | 6/1985 | Germany | 95/279 |
|---|---|---|---|
| 56-17928 | 4/1981 | Japan | 95/282 |
| 62-53722 | 3/1987 | Japan | 95/280 |

Primary Examiner—C. Scott Bushey
Attorney, Agent, or Firm—Nilles & Nilles, S.C.

[57] ABSTRACT

A bag cleaning apparatus removes caked dust from the bags of a baghouse and prevents the removed dust from being recaptured. The outlets of each bag subject to cleaning and all adjacent bags are closed during the cleaning process and for a sufficient time following the cleaning process to assure that the dislodged cake falls into the lower hopper of the baghouse. Provisions are also made to clean portions of each bag more than others, where necessary, and to vary cleaning among the bags to optimize baghouse efficiency. A reverse air flow cleaning technique is preferably employed because it provides gentler cleaning than other known bag cleaning techniques and thus increases the life of the bags.

20 Claims, 4 Drawing Sheets

BAGHOUSE CLEANING METHOD

BACKGROUND OF THE INVENTION

1. Field of the Invention

The invention relates to a method and apparatus for cleaning baghouses used in plants used, for example, for the production of hot mix asphalt, more particularly, relates to an improved method and apparatus for removing particulate materials that have caked onto the outer surfaces of the bags of such a baghouse.

2. Discussion of the Related Art

Baghouses are well known for collecting fines, soot and other particulates (commonly known collectively as dust) from exhaust streams from dryers, mixers, and other apparatus used, for example, in the production of hot mix asphalt (HMA), in soil remediation processes, in milling processes, woodworking processes, etc. The typical baghouse includes a metal enclosure in which are disposed a lower filter chamber and an upper clarified gas plenum separated by a horizontal partition extending the length of the enclosure. A plurality of bags made of cloth or another gas permeable material are suspended from the partition and have upper outlets opening into the plenum. A contaminated gas inlet opens into the filter chamber, and a clarified gas outlet is formed in the plenum and is connected to the inlet of a fan or blower drawing gases through the baghouse.

In use, dust in the gases is collected on the outer surface of the bags as the gases flow therethrough, thus clarifying the gases. The dust collected on the outer surface of the bag quickly forms a cake which at first enhances the dust removal capability of the bags but inhibits further flow of gases into the bags as the thickness of the cake increases. Some of the dust must be periodically removed to reduce the thickness of the cake to maintain the effectiveness of the baghouse. Commonly used dust removal techniques include mechanical shaking, pulsed air injection or jet pulse injection, and reverse air flow. Mechanical shaking and pulsed air injection tend to be the most effective because they highly agitate the bag structure, but both accelerate bag wear and both risk bag tearing and both require rather complex structures. Examples of employing mechanical and pulsed air or jet pulse bag cleaning assemblies are disclosed in U.S. Pat. Nos. 2,829,735 to Kroll and 3,739,557 to Anderson et al., respectively.

The effectiveness the pulse jet bag cleaning technique is limited further by the fact that contaminated gases continue to flow through the cleaned bags during or at least immediately after the bag cleaning process. Thus, much of the dust removed from a bag during cleaning is recaptured on the same or an adjacent bag a short distance from the release point. This recapture causes the bag to be relatively clean at the top while having a relatively thick layer of dust caked onto the bottom. The uneven accumulation along the length of the bag is exacerbated by the fact that larger, heavier particles fall faster than relatively fine, light particles and are more apt to cake onto the lower portion of the bags. This uneven dust accumulation results in an uneven gas velocity through the bag and a resulting variation in filter efficiency from bottom to top.

Reverse air flow, on the other hand, relies on a gentle "puffing" of the bag rather than a vigorous shaking and thus presents little risk to the bag. Indeed, some theorize that this puffing provides little if any direct agitation to the bag and that it merely serves to temporarily permit the bag, which is normally drawn up against the frame by gases flowing therethrough, to relax and form a more natural shape, thereby breaking up layers of caked particulates. The typical reverse air flow system isolates a module of many rows of bags during the cleaning process, cleans all isolated bags simultaneously, and then places all of the isolated bags back on-line when the next module is cleaned. An example of a reverse air flow bag cleaning system is disclosed in U.S. Pat. No. 3,951,627 to Barr, Jr., et al.

The effectiveness of many known dust cleaning techniques is further hindered by the fact that dust tends to accumulate differently on bags at different locations in the baghouse. For instance, particulate accumulate on the upper portions of the bags tends to be greater on the outer bags in a row and on the bags near the front of the baghouse where the gases contact the bag at greater velocities. The ratio of fine dust particles to coarse particles also tends to vary from bag to bag. Bag cleaning should preferably be optimized to accommodate variations in accumulation described to avoid overcleaning or undercleaning. Undercleaning, i.e., removing too little dust from bags, decreases the overall efficiency of the baghouse by unduly inhibiting the flow of gases through the bags. Overcleaning, i.e., removing too much dust from bags, leads to the flow of an undesirable percentage of fine particles through the bags and out of the baghouse. The need therefore exists to control the amount of cleaning along the length of each bag and from bag to bag to optimize bag cleaning. No known prior art bag cleaning systems satisfy this need.

OBJECTS AND SUMMARY OF THE INVENTION

It is therefore an object of the invention to provide an improved bag cleaning process in which particulates removed from the bag are inhibited from being recaptured on the same or adjacent bags after the cleaning operation.

In accordance with a first aspect of the invention, these objects are achieved by conveying contaminated gases into a baghouse in which are located a plurality of parallel rows of bags each formed from a gas-permeable material, and conveying the gases into selected ones of the bags from exteriors thereof and out of upper outlets thereof, thereby clarifying the gases. The bags are cleaned by inhibiting gas flow into a designated bag, then removing dust caked onto the exterior of the designated bag, and then permitting gas to flow into the designated bag again.

Preferably, in order to minimize the risk of dust recapture and to simplify operation, the closing step comprises simultaneously closing the outlets in all of the bags of a designated row containing the designated bag. Recapture is inhibited further by simultaneously closing all of the bags in rows flanking the designated row while leaving the outlets in the bags of the remaining rows open.

Another object of the invention is to provide a method of optimizing cleaning along the length of bags and from bag to bag through suitable control of the cleaning system.

In accordance with another aspect of the invention, this object is achieved by providing a method having one or more of the characteristics described above and in which the removing step comprises blowing low pressure air into the bags of the second row from orifices located therein, each of the orifices being located and dimensioned to optimize dust removal for the bag in which it is located.

Another object of the invention is to provide a bag cleaning process which can be performed less frequently than conventional cleaning processes, thereby permitting the use of a smaller baghouse in a particular system.

Yet another object of the invention is to provide an improved bag cleaning system which is relatively simple in construction and operation but which inhibits removed dust from being recaptured on the same or adjacent bags.

In accordance with still another aspect of the invention, these objects are achieved by providing a system comprising a baghouse having front and rear ends, a contaminated gas inlet, and a clarified gas outlet. A plurality of bags are located in the baghouse in at least four transversely extending rows, each of the bags being formed from a gas-permeable material and having an upper outlet. A plurality of cap devices are also provided, each of which is normally spaced above a respective one of the bags so as to permit gases to flow freely out of the upper outlet of the respective bag but which is lowerable to a position closing the upper outlet so as to at least substantially prevent the flow of gases out of the upper outlet, thereby inhibiting gas flow into the respective bag. Finally, means, operable when the outlets of the bags are closed by the cap devices, are provided for removing dust from the exteriors of the bags. The means for removing could comprise a mechanical cleaning assembly, a jet pulse cleaning assembly, or any other known cleaning assembly but preferably comprises a reverse air flow cleaning assembly including a source of low pressure air, a plurality of supply manifolds connected to the source and extending in parallel with the rows of bags, and a plurality of supply pipes, each of which extends downwardly from one of the manifolds and terminates in an orifice positioned within a respective one of the bags.

The cap devices preferably comprise flat disks and are suspended from vertically movable bars each of which extends in parallel with one of the rows of bags.

In order to permit bag cleaning optimization, some of the supply pipes extend further into the bags than others, thereby placing each of the orifices at a location which enhances dust removal capability for the respective bag.

These and other objects, features, and advantages of the present invention will become apparent to those skilled in the art from the following detailed description and accompanying drawings. It should be understood, however, the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

A bag cleaning apparatus removes caked dust from the bags of a baghouse and prevents the removed dust from being recaptured. The outlets of each bag subject to cleaning and all adjacent bags are closed during the cleaning process and for a sufficient time following the cleaning process to assure that the dislodged cake falls into the lower hopper of the baghouse. Provisions are also made to clean portions of each bag more than others, where necessary, and to vary cleaning among the bags to optimize baghouse efficiency. A reverse air flow cleaning technique is preferably employed because it provides gentler cleaning than other known bag cleaning techniques and thus increases the life of the bags.

2. System Overview and Construction of Bag Cleaning Assembly

Figure 1:
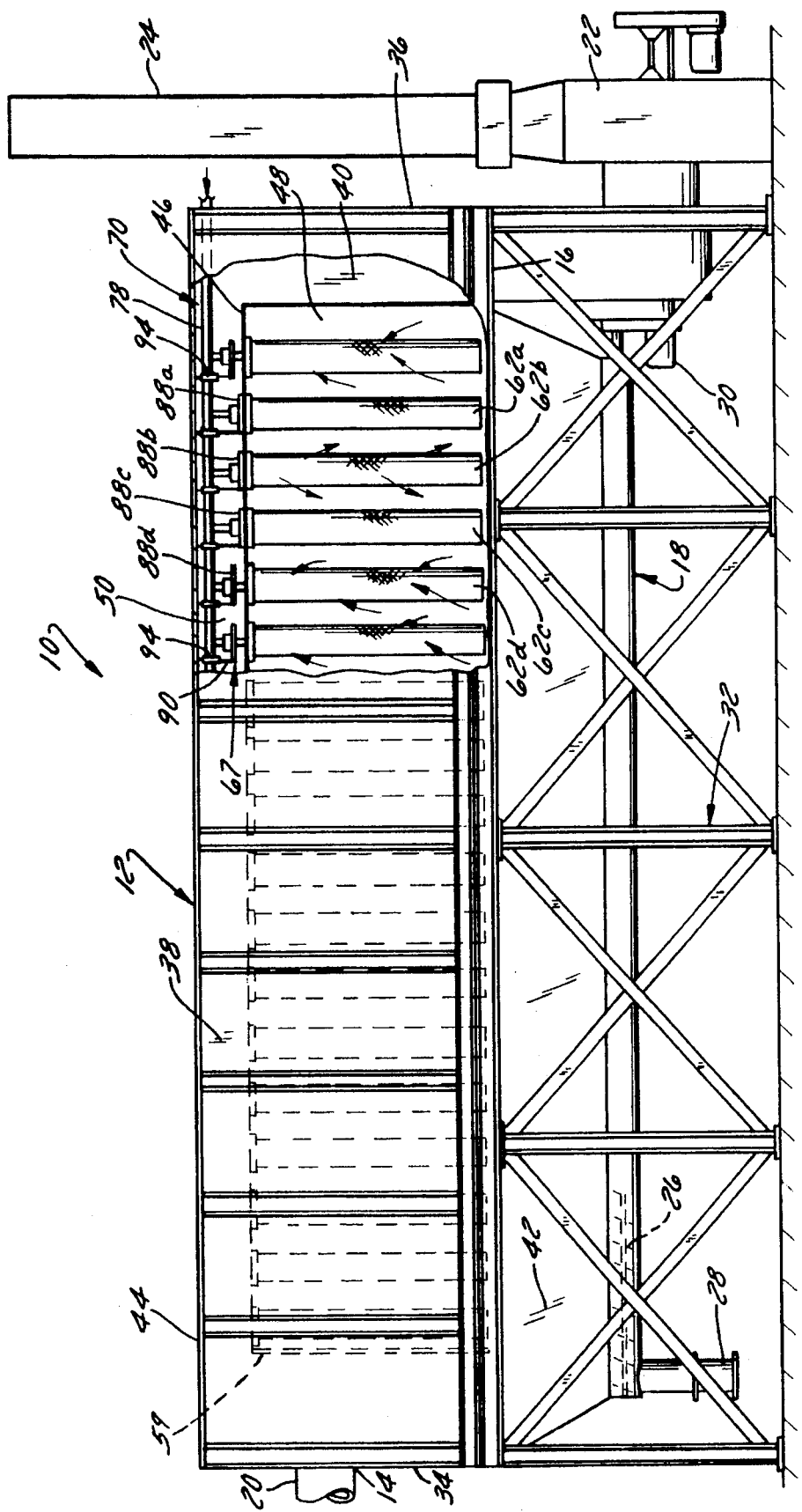
FIG. 1 is a partially cut away side elevation view of a baghouse constructed in accordance with the preferred embodiment of the invention.
Figure 2:
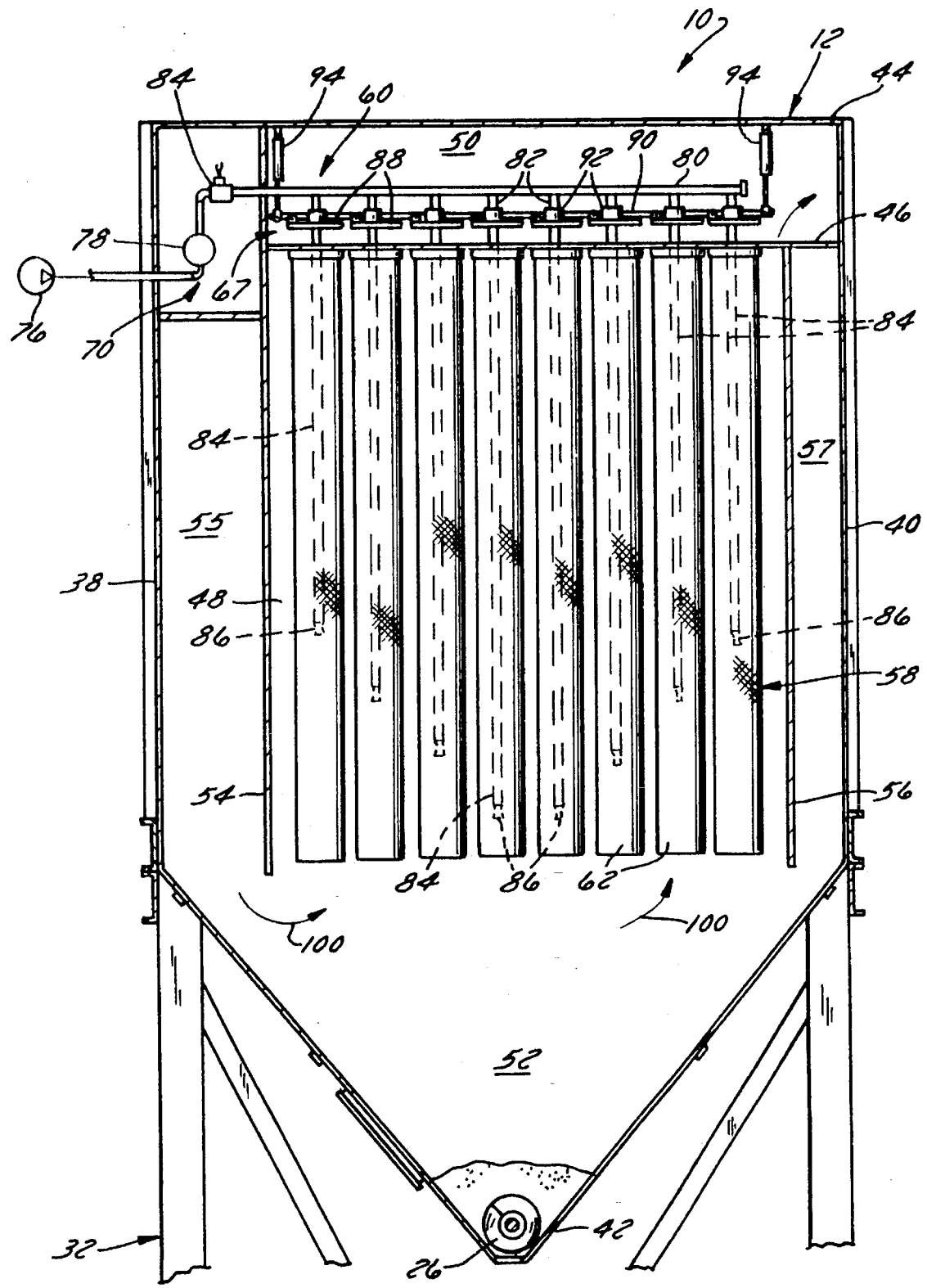
FIG. 2 is a sectional end elevation view of the baghouse of FIG. 1.
Figure 3:
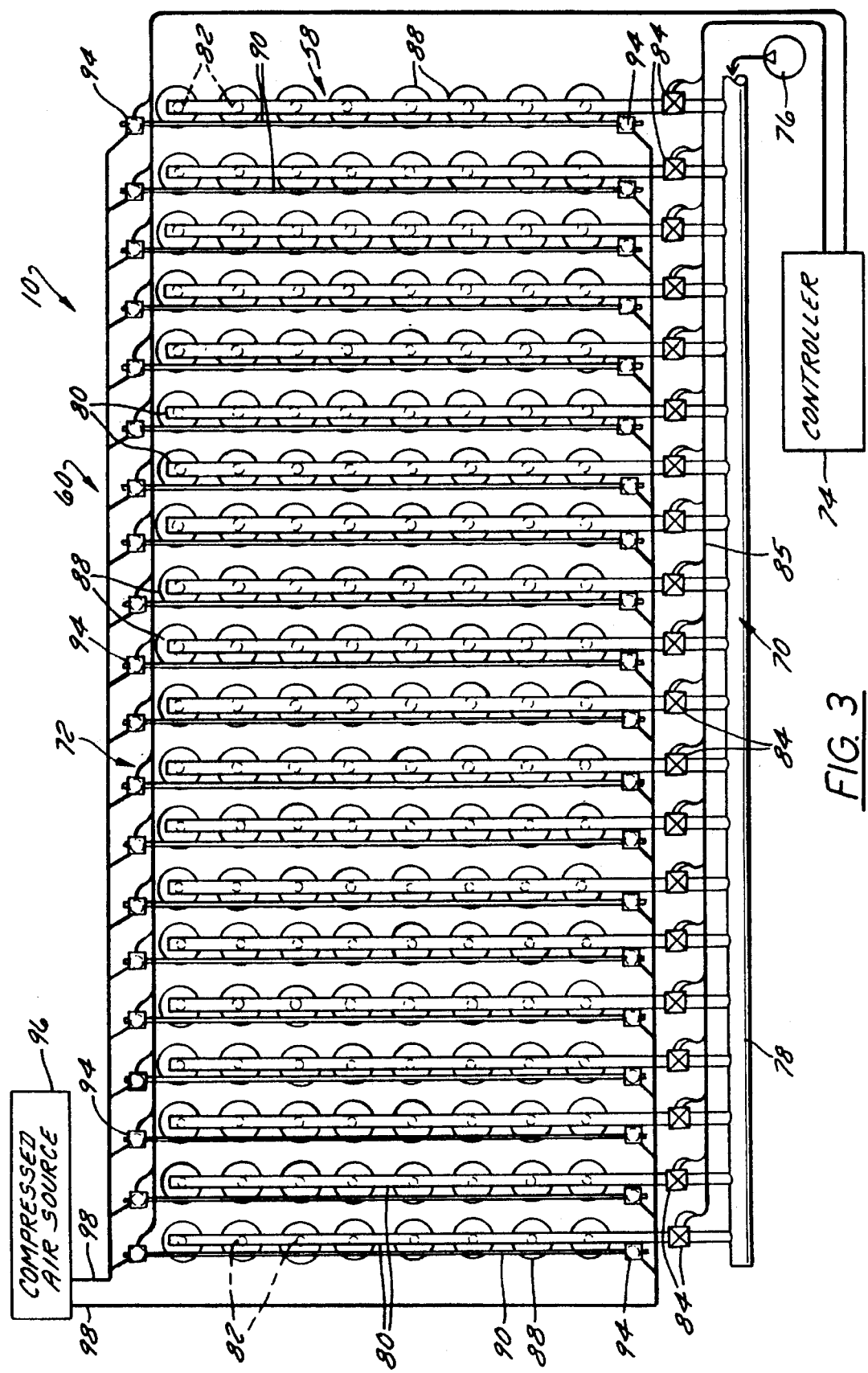
FIG. 3 is a schematic plan view of the baghouse of FIGS. 1 and 2.

Referring now to the drawings and initially to FIGS. 1 through 3 in particular, a baghouse 10 is illustrated which is useable, for example, in a hot mix asphalt (HMA) production plant and which clarifies exhaust gases from dryers, mixers, coater/mixers, and/or other components of the plant. The baghouse 10 includes an enclosure 12 having a front contaminated gas inlet 14 and a rear clarified gas outlet 16. The contaminated gas inlet 14 is connected to the exhaust duct of an upstream device by a supply duct 20, and the clarified gas outlet 16 is vented to atmosphere via an exhaust fan 22 and an exhaust stack 24 located behind the enclosure 12. A dust removal assembly 18 is disposed in the bottom of the enclosure 12 and includes a helical screw conveyor 26 running the length of the enclosure 12 and emptying into a discharge pipe 28 located at the front of the enclosure 12, The screw conveyor 26 is driven in the conventional manner by a suitable motor 30.

The enclosure 12 is mounted on a frame assembly 32 and includes front and rear walls 34, 36, first and second side walls 38, 40 connecting the front and rear walls to one another, a sloped floor 42 receiving the helical screw conveyor 26 at the lower end thereof, and an upper ceiling 44. A horizontal partition 46 extends nearly the entire length of the enclosure 12 to separate the enclosure interior into a lower filter chamber 48 and an upper plenum 50. A dust collection chamber 52 is formed beneath the filter chamber 48 and receives the helical screw conveyor 26. Baffles 54 and 56 extend about one-half to two-thirds the length of the enclosure 12 from the inlet 14 to define distribution lanes 55 and 57 between the baffles and the enclosure walls 38 and 40. An additional baffle 59 is located near the front of the enclosure 12 and extends transversely between the baffles 54 and 56. Baffle 59 forms a knock-out plate the purpose of which is, per se, well known and will be discussed briefly below.

Figure 4:
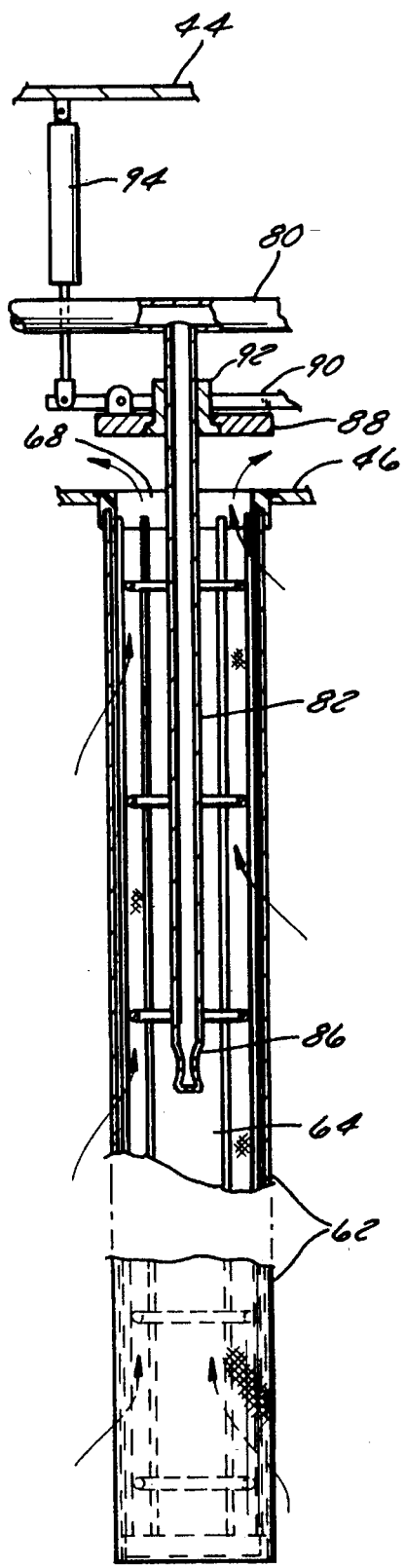
FIGS. 4 and 5 are partially cut away side elevation views of a bag and accompanying portions of the baghouse of FIGS. 1, 2 and 3, illustrating the accompanying bag cleaning device in inoperative and operative conditions, respectively.

A filter assembly 58 and a bag cleaning system 60 are also located within the enclosure 12. The filter assembly 58 is, per se, conventional and includes an array of bags 62 suspended from the partition 46 and arranged in a plurality of transversely extending rows. The illustrated filter assembly 58 includes twenty rows of eight bags 62 per row, but the invention is equally applicable to both smaller and larger baghouses. The bags 62 are suspended from the partition 46 and are formed from cloth or another semi-permeable material which permits relatively free gas flow therethrough but which captures dust particles on its outer surface. The bags 62 also have upper outlets 66 opening into corresponding apertures 68 formed in the partition 46. Frames or skeletons 64 (FIGS. 4 and 5) are inserted in the bags 62 to retain their cylindrical shape.

The bag cleaning system 60 is designed to periodically clean selected bags 62 while inhibiting recapture of the removed dust on the cleaned bags as well as on adjacent bags. To this end, the bag cleaning system 60 includes a dust removal assembly 70 and a bag deactivation assembly 72 the operation of which are coordinated by a common controller 74 (FIG. 3).

The dust removal assembly 70 could comprise a jet pulse cleaning assembly or a mechanical cleaning assembly but preferably comprises a reverse air flow assembly periodically supplying low pressure air to the selected bags 62 from a blower 76. Air is supplied to the bags 62 from the blower 76 via a common supply pipe 78 running longitudinally along the sidewall 38 of the enclosure 12, a plurality of air supply manifolds 80 extending transversely of the enclosure 12 directly above respective rows of bags 62, and supply pipes 82 extending vertically through the outlets 66 and into the interiors of the bags 62. A plurality of electronically controlled valves 84, each of which is actuated by a signal line 85 connected to the controller 74, selectively close the air supply manifolds 80 and permit air flow therethrough. The supply pipes 82 have inlets opening into a respective air supply manifold 80 and extend into the bags 62 through a distance which, as illustrated in FIG. 2, varies from bag to bag so as to supply cleaning air at the optimal location within each bag. Each of the supply pipes 82 terminates in a nozzle or orifice 86 the diameter of which is preferably set to optimize the supply of air for that particular bag 62. Although a single nozzle or orifice 86 is illustrated on the end of each supply pipe 82, it is conceivable that several such orifices could be located along the length of each pipe to optimize air distribution along the length of the bag 62.

The bag deactivation assembly 72 preferably comprises a plurality of cap devices for selectively closing the outlets 66 of the bags 62 and, in the illustrative embodiment, comprises a plurality of disks 88 each of which is positioned directly above a respective bag outlet 66. Each disk 88 has a diameter which is equal to or greater than the diameter of the bag outlet 66 and the corresponding aperture 68 in the partition 46 such that, when a disc 88 is lowered towards the partition 46, the corresponding bag outlet 66 is closed. The disks 88 associated with each row of bags are suspended from a common bar 90 which extends in parallel with the row and which is vertically movable to raise and lower the disks 88 to open and close the outlets 66 in the bags 62. This raising and lowering could be performed by any suitable cylinder or screw device and preferably is performed by single acting pneumatic cylinders 94 suspending the bars 90 from the ceiling 44 of the enclosure 12. The cylinders 94 are connected to a common source 96 of compressed air and are activated by the controller 74 via a signal line 98. Each disk 88 is attached to a bushing 92 which is guided on the associated supply pipe 82, thus assuring that the disks 88 remain parallel with the partition 46 and close the bag outlets 66 upon lowering.

The controller 74 may comprise any device capable of electronically activating the valves 84 and the cylinders 94 and preferably comprises a pre-programmed electronic control unit (ECU) sequentially controlling the valves 84 and cylinders 94 as detailed below. Controller 74 also either includes or is connected to a timer which controls the timing and duration of bag closure and air reversal. This timer may be of the type commonly employed by conventional pulsed air injection bag cleaning systems.

3. Operation of Baghouse

Figure 5:
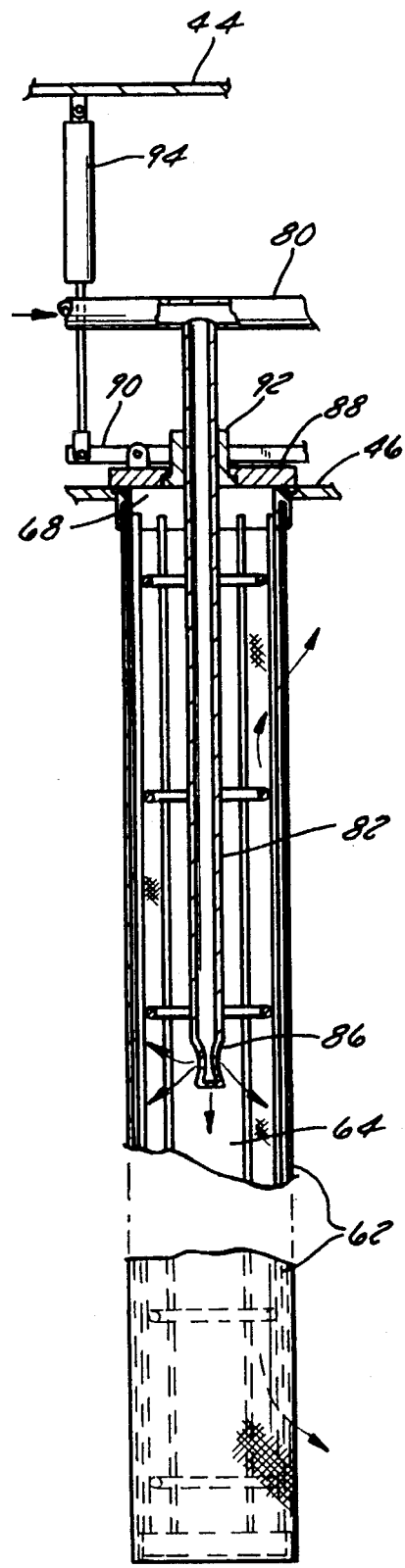

In operation, air or other gases laden with soot, fines, or any other particulate material (dust) is drawn into and through the baghouse 10 where it is clarified. Specifically, the gases are drawn into the inlet 14 of enclosure 12 from the supply duct 20. Gases in the enclosure 12 impinge on the baffle or knock-out plate 59, where many of the heavier dust particles fall by gravity into the collection chamber. The gases are then distributed more or less evenly along the length of the enclosure 12 by the baffles 54 and 56 which promote flow down a clear lane 55 or 57 on each side of the enclosure 12 and through the space between the bottom of the bags 62 and the dust collection chamber 52 as illustrated by the arrows 100 in FIG. 2. The thus distributed gases flow through the cloth bags 62, out of the outlets 66, and into the plenum 50 as clarified gases as illustrated in FIG. 5. The clarified gases are then drawn by the exhaust fan 22 out of the enclosure outlet 16 and out of the exhaust stack 24. Much of the dust in the gases is collected on the exterior of the bags 62 as the gases flow through the bags, and this dust accumulates to form a cake which, if not partially removed, would inhibit further gas flow through the bags 62. This cake is periodically removed via the bag cleaning system 60 as follows:

First, referring to FIG. 1 and, the pneumatic cylinders 94 above first through third rows 62a, 62b, and 62c of bags 62 are extended under operation of the controller 74 to lower the associated bars 90 and disks 88a, 88b and 88c so as to cover apertures 68 in the partition 46, thereby closing the outlets 66 in the bags of rows 62a, 62b, and 62c and taking these bags off-line by preventing further gas flow through the bags. In practice, the bags of the rows 62a and 62b would have been closed prior to this operation, and only the bar 90 above the row 62c would need to be lowered. The valve 84 of the air manifold 80 of the second row 62b is then actuated by the controller 74 for a relatively short period of, e.g., 0.14 seconds to supply enough air to reverse the flow of air through the bags of row 62b as illustrated in FIGS. 1 and 5. In practice, about 0.5 cubic feet of air should be sufficient to provide two IWG (inches water gauge) across the bags of an 8 bag row, and this small pressure difference should be sufficient for adequate cleaning. This gentle air flow slightly relaxes the bags 62 to break the dust cake, which then falls away from the bags. The disks 88a–88c for the row 62b of bags to be cleaned and the two adjacent rows 62a and 62c remain lowered for as much as a full second after termination of reverse air flow to assure that the removed dust falls into the dust collection chamber 52 rather than being recaptured on the bags being cleaned or adjacent bags. The bags of the remaining rows remain on-line during the sequence by leaving the disks 88 in the raised position illustrated in FIG. 4. The disks 88a are then raised by retracting the associated cylinders 94 to place the bags of row 62a back on-line. The rows 62b and 62c (representing the bags last cleaned and the next bags to be cleaned) remain closed between cleanings to provide more uniform controlled pattern cleaning from top to bottom of each bag.

In the next cleaning cycle, typically taking place about one minute after the reverse flow of air is supplied to the bags of row 62b, the first row 62a of bags is left on-line and the fourth 62d row of bags is taken off-line by lowering the bar 90 supporting disks 88d. The third row 62c of bags is then cleaned without dust recapture using the procedure described above with respect to row 62b. This sequence is repeated at regular intervals, with the next row of bags in line being cleaned during each cycle, such that all rows of bags are sequentially cleaned in a ripple effect from the front end of the enclosure 12 to the rear end.

Because dust is not recaptured during the cleaning process, cleaning efficiency is markedly enhanced as compared to prior art processes, thus permitting cleaning to be performed much less often.

As discussed briefly above, cleaning efficiency can also be significantly enhanced by controlling the flow of cleaning air in and among the bags to optimize cleaning for each bag. The orifice 86 in each bag 62 is thus positioned at a location within that bag where dust accumulation tends to be the greatest, and larger nozzles or orifices are used to supply more air to those bags in which dust accumulation tends to be the greatest. This arrangement permits the selective cleaning of portions of each bag more than others. For example, this arrangement permits more vigorous cleaning of those portions of a bag where more large particles can be captured than of those portions where it is more difficult to form an effective filter cake. Moreover, the orifices, pipes, and disks in combination provide more control over how much of the filter cake is removed, thus preventing overcleaning.

The configuration illustrated in FIG. 2 uses relatively long supply pipes 82 in the center bags and short pipes in the outer bags to accommodate the fact that the settling velocity of each particle is a function of its size, shape, and density. In practice, size is most significant because shape and density are fairly uniform for a given baghouse application. Each size particle can thus be presumed to settle at a particular settling speed, with the actual velocity of particle movement depending upon its settling speed and upon the velocity of the gas transporting it. The horizontal velocity of the gases through the major gas distribution lanes 55 and 57 decreases from the inlet end of the enclosure 12 to the outlet end. Gas flow through the bags nearest the side walls 38 and 40 of the enclosure 12, coming primarily from the distribution lanes 55 and 57, is thus nearly horizontal immediately behind the baffle 59. The flow to the center bags, on the other hand, is largely from the area below the bags 62 and is nearly vertical. Large particles resist changes in direction more than do small particles. Thus, greater accumulations of large dust particles tend to form on the upper portions of the outer bags and on the lower portions of the inner bags. Removal of these dust particles can thus be enhanced by positioning the orifices 86 as illustrated in FIG. 2.

The above discussion is merely illustrative of one possible bag cleaning scheme and may vary in practice depending upon the configuration of a particular baghouse and upon the properties of the particles being removed. The important consideration is to employ a nozzle location and configuration which permits each bag to be cleaned to a degree and in a pattern which promotes the best overall performance of the baghouse.

It can thus be seen that the inventive bag cleaning system permits better controlled, more gentle, and more effective bag cleaning than is possible with prior art bag cleaning systems. Of course, many changes could be made to the invention as disclosed without departing from the spirit thereof. For instance, the illustrative reverse air flow bag cleaning assembly could be replaced with mechanical or jet pulse cleaning assemblies. The scope of these and other changes will become more clear from the appended claims.

I claim:

1. A method comprising:
   (A) conveying contaminated gases into a baghouse in which are located a plurality of parallel rows of bags each formed from a gas-permeable material;
   (B) conveying said gases into selected ones of said bags from exteriors thereof and out of upper outlets thereof, thereby clarifying said gases;
   (C) inhibiting gas flow through all of the bags of first, second and third adjacent rows, said second row being located between said first and third rows; then
   (D) removing dust caked onto the exterior of said second row only; and then
   (E) permitting gas to flow through said bags of said first row again.

2. A method as defined in claim 1, wherein said step (C) comprises closing an outlet of each of said bags of said second row, thereby preventing gases from flowing out of said outlet of each of said bags of said second row and inhibiting gas flow through each of said bags of said second row.

3. A method as defined in claim 2, wherein said closing step comprises lowering a disk into a position that closes said outlet of each said bags of said second row.

4. A method as defined in claim 2, wherein said closing step comprises simultaneously closing the outlets in all of the bags of said second row.

5. A method as defined in claim 4, wherein said baghouse includes more than three rows of bags, and wherein said closing step further comprises simultaneously closing all of the bags in said first, second and third adjacent rows while leaving the outlets in the bags of the remaining rows open.

6. A method as defined in claim 4, wherein said closing step comprises lowering a bar which extends in parallel with said second row, thereby lowering disks suspended from said bar into a position closing the outlets of said bags of said second row.

7. A method as defined in claim 1, wherein said removing step comprises one of injecting a pulse of compressed air into said bags of said second row, and blowing air under a pressure of at least approximately two inches water gauge into said bags of said second row.

8. A method as defined in claim 1, wherein said removing step comprises blowing air at a pressure of at least approximately two inches water gauge into said bags of said second row from orifices located within said bags of said second row.

9. A method comprising:
   (A) conveying contaminated gases into a baghouse in which are located a plurality of parallel rows of bags each formed from a gas-permeable material;
   (B) conveying said gases into selected ones of said bags from the exteriors thereof and out of upper outlets thereof, thereby clarifying said gases;
   (C) conveying the clarified gases out of said baghouse;
   (D) selectively closing the outlets in all of the bags of first, second and third adjacent rows while leaving the outlets in the bags of the remaining rows open, thereby preventing gases from flowing into said bags of said first, second and third rows from the outside, said second row being located between said first and third rows and being located between said first row and a rear end of said baghouse; and then
   (E) removing dust from the exterior of the bags of said second row only; and then
   (F) opening the outlets in said bags of at least said first row, thereby permitting gas flow into said bags of said first row to resume.

10. A method as defined in claim 9, wherein said step (F) comprises opening said bags of said first row while leaving said bags of said second and third rows closed, and further comprising
   (A) after said step (F), closing the outlets in the bags of a fourth row located adjacent said third row while leaving the bags of all rows except for said second, third, and fourth rows open, and then
   (B) removing dust from the exteriors of said third row.

11. A method as defined in claim 9, wherein said closing step comprises lowering first, second, and third bars which each extend in parallel with a respective one of said first, second, and third rows, thereby lowering disks suspended from said bars into a position closing the outlets of said bags of said first, second, and third rows.

12. A method as defined in claim 9, wherein said removing step comprises blowing air at a pressure of at least approximately two inches water gauge into said bags of said second row from orifices located therein, each of said orifices being located and dimensioned to optimize dust removal for the bag in which it is located.

13. A method comprising:

(A) conveying contaminated gases into a baghouse in which are located a plurality of rows of bags each formed from a gas-permeable material;

(B) conveying said gases into selected ones of said bags from exteriors thereof and out of upper outlets thereof, thereby clarifying said gases;

(C) inhibiting gas flow through i) a bag that is to be subject to cleaning and ii) all adjacent bags; then (D) removing dust caked onto the exterior of said bag that is to be subject to cleaning only; and then (E) permitting gas to flow through at least one of said adjacent bags.

14. A method as defined in claim 13, wherein said step (C) ii) comprises closing an outlet of each of a plurality of bags of one adjacent row, thereby preventing gases from flowing out of said outlet of each of said plurality of bags of said one adjacent row and inhibiting gas flow through each of said plurality of bags of said one adjacent row.

15. A method as defined in claim 14, wherein said closing comprises lowering a disk into a position that closes said outlet of each of said plurality of bags of said one adjacent row.

16. A method as defined in claim 14, wherein said closing step comprises simultaneously closing said outlet of each of said plurality of bags of said one adjacent row.

17. A method as defined in claim 16, wherein said baghouse includes more than three rows of bags, and wherein said closing further comprises simultaneously closing both a) said outlet of each of said plurality of bags of said one adjacent row and b) an outlet of each of a plurality of bags of another adjacent row.

18. A method as defined in claim 16, wherein said closing comprises lowering a bar which extends in parallel with said one adjacent row, thereby lowering disks suspended from said bar into a position closing said outlet of each of said plurality of bags of said one adjacent row.

19. A method as defined in claim 13, wherein said removing step comprises one of injecting a pulse of compressed air into said designated bag and blowing air under a pressure of at least approximately two inches water gauge into said designated bag.

20. A method as defined in claim 13, wherein said removing step comprises blowing air at a pressure of at least approximately two inches water gauge into said designated bag from an orifices located within said designated bag.

* * * * *